(12) United States Patent
Choi et al.

(10) Patent No.: US 10,662,902 B2
(45) Date of Patent: May 26, 2020

(54) PURGE CONTROL SOLENOID VALVE

(71) Applicants: HYUNDAI MOTOR COMPANY, Seoul (KR); KIA MOTORS CORPORATION, Seoul (KR); HYUNDAI KEFICO CORPORATION, Gunpo-si, Gyeonggi-do (KR)

(72) Inventors: Choo Saeng Choi, Seongnam-si (KR); Ahn Hee Lee, Gunpo-si (KR)

(73) Assignees: HYUNDAI MOTOR COMPANY, Seoul (KR); KIA MOTORS CORPORATION, Seoul (KR); HYUNDAI KEFICO CORPORATION, Gunpo-si, Gyeonggi-Do (KR)

( * ) Notice: Subject to any disclaimer, the term of this patent is extended or adjusted under 35 U.S.C. 154(b) by 0 days.

(21) Appl. No.: 16/162,600

(22) Filed: Oct. 17, 2018

(65) Prior Publication Data
US 2019/0186424 A1    Jun. 20, 2019

(30) Foreign Application Priority Data

Dec. 19, 2017    (KR) .................. 10-2017-0175194

(51) Int. Cl.
| | | |
|---|---|---|
| F02M 25/08 | (2006.01) |
| F16K 15/14 | (2006.01) |
| F16K 31/06 | (2006.01) |
| F16K 15/10 | (2006.01) |

(52) U.S. Cl.
CPC .... F02M 25/0836 (2013.01); F02M 25/0854 (2013.01); F16K 15/10 (2013.01); F16K 15/145 (2013.01); F16K 31/0655 (2013.01); F02M 2025/0845 (2013.01)

(58) Field of Classification Search
CPC ........... F02M 25/0836; F02M 25/0854; F02M 2025/0845; F16K 31/0655; F16K 15/10; F16K 15/145
USPC .................................................. 123/518–520
See application file for complete search history.

(56) References Cited

U.S. PATENT DOCUMENTS

| | | | | |
|---|---|---|---|---|
| 4,944,276 A | * | 7/1990 | House ................ | F02M 25/0836 123/520 |
| 4,986,246 A | * | 1/1991 | Kessler de Vivie | ........................ F02M 25/0836 123/519 |
| 5,069,188 A | * | 12/1991 | Cook ................. | F02M 25/0836 123/516 |

(Continued)

FOREIGN PATENT DOCUMENTS

| | | |
|---|---|---|
| JP | 4375436 B | 12/2009 |
| KR | 10-1350656 B | 1/2014 |

*Primary Examiner* — Hung Q Nguyen
*Assistant Examiner* — Brian R Kirby
(74) *Attorney, Agent, or Firm* — Brinks Gilson & Lione

(57) ABSTRACT

A purge control solenoid valve may include a middle housing in which an inlet flow path is formed and a middle flow path is formed on a center; a valve housing in which a driving module selectively communicating the inlet flow path and the middle flow path is installed; an upper cover coupled to the upper part of the middle housing and including a upper flow path selectively communicated with the middle flow path on the center; and a membrane provided on the upper cover and selectively communicating the middle flow path and the upper flow path.

9 Claims, 8 Drawing Sheets

(56) References Cited

U.S. PATENT DOCUMENTS

| | | | | |
|---|---|---|---|---|
| 5,083,546 A * | 1/1992 | Detweiler | F02M 25/0836 | 123/516 |
| 5,183,022 A * | 2/1993 | Cook | F02M 25/0836 | 123/516 |
| 5,383,437 A * | 1/1995 | Cook | F02M 25/0809 | 123/198 D |
| 5,460,137 A * | 10/1995 | Zabeck | F02M 25/0809 | 123/516 |
| 5,524,593 A * | 6/1996 | Denne | F02M 25/0836 | 123/458 |
| 5,749,349 A * | 5/1998 | Detweiler | F02M 25/0836 | 123/198 D |
| 5,791,318 A * | 8/1998 | Schulz | F02M 25/0836 | 123/520 |
| 5,878,725 A * | 3/1999 | Osterbrink | F02M 25/0836 | 123/516 |
| 6,050,245 A * | 4/2000 | Cook | F16K 31/0675 | 123/520 |
| 6,548,837 B1 * | 4/2003 | Vaz De Azevedo | F02M 25/0836 | 123/520 |
| 6,568,374 B2 * | 5/2003 | Balsdon | F02M 25/0809 | 123/519 |
| 6,581,904 B2 * | 6/2003 | Watanabe | F16K 31/0655 | 251/129.01 |
| 6,662,827 B1 * | 12/2003 | Clougherty | B65D 77/225 | 137/859 |
| 6,739,573 B1 * | 5/2004 | Balsdon | F16K 31/0696 | 251/129.05 |
| 7,077,111 B2 * | 7/2006 | Robertson | F02M 25/0836 | 123/458 |
| 7,950,621 B2 * | 5/2011 | Meinig | F16K 7/17 | 251/61.4 |
| 9,416,756 B2 * | 8/2016 | Kishi | F02M 25/0836 | |
| 9,840,986 B2 * | 12/2017 | Onodera | F02M 25/0836 | |
| 2005/0269539 A1 * | 12/2005 | Schulz | F02M 25/0836 | 251/129.22 |
| 2005/0279331 A1 * | 12/2005 | Robertson | F02M 25/0836 | 123/520 |
| 2015/0096625 A1 * | 4/2015 | Mills | F16K 17/048 | 137/12 |
| 2015/0330514 A1 * | 11/2015 | Harada | F16K 1/526 | 137/484.2 |
| 2015/0352349 A1 * | 12/2015 | Carmody | A61M 5/165 | 137/544 |
| 2016/0298778 A1 * | 10/2016 | Young | B60K 15/03519 | |

\* cited by examiner

PURGE CONTROL SOLENOID VALVE

CROSS-REFERENCE TO RELATED APPLICATION

This application claims priority to and the benefit of Korean Patent Application No. 10-2017-0175194, filed on Dec. 19, 2017, the entire contents of which are incorporated herein by reference.

FIELD

The present disclosure relates to a purge control solenoid valve. More particularly, the present disclosure relates to a purge control solenoid valve applied to a fuel vapor purge system.

BACKGROUND

The statements in this section merely provide background information related to the present disclosure and may not constitute prior art.

In order to enhance an exhaust gas, many researches have been performed in a vehicle industry, and particularly, in order to reduce discharge of hydrocarbon (HC) among evaporation gas components of gasoline fuel, foreign countries adapt a regulation that regulates a total amount of a fuel evaporation gas to 0.5 g/day or less and are scheduled to sequentially enlarge a total amount of a fuel evaporation gas to 0.054 g/day or less.

In order to meet the regulation, nowadays, a material of a fuel tank and a connection structure thereof have been improved to reduce occurrence of a fuel evaporation gas that penetrates the fuel tank, and a fuel evaporation gas recirculation apparatus in which a canister is applied to a fuel supply apparatus has been used.

Here, the canister contains an adsorbent material that can absorb a fuel evaporation gas from a fuel tank that stores volatile fuel, and in order to prevent a fuel evaporation gas that evaporates from a float chamber of a vaporizer and the fuel tank from being discharged to the air, the canister is connected with the fuel tank to collect the fuel evaporation gas.

In this way, the fuel evaporation gas that is collected in the canister is again injected into the engine through a Purge Control Solenoid Valve (PCSV) that is controlled by an Engine Control Unit (hereinafter, referred to as an 'ECU') to be burned and thus the fuel evaporation gas is recirculated.

The purge control solenoid valve is installed on a purge line and selectively blocks the collected fuel vapor in the canister. An operation of the purge control solenoid valve is controlled by the ECU, and a fuel vapor amount exhausted through the purge control solenoid valve is adjusted by a duty control of the ECU.

In the fuel vapor purge system according to a conventional art, a separate check valve for preventing the fuel vapor from flowing backward on a lower stream of the purge control solenoid valve is additionally installed. The check valve is engaged to a hose to which the fuel vapor flows, in this case, since a connection clip should be separately used and a length of the hose extends to engage the check valve, parts and workers are increased, thereby raising a manufacturing cost.

The above information disclosed in this Background section is only for enhancement of understanding of the background of the present disclosure and therefore it may contain information that does not form the prior art that is already known to a person of ordinary skill in the art.

SUMMARY

The present disclosure provides a purge control solenoid valve of a new structure by adding a function of a check valve to a purge control solenoid valve applied to a fuel vapor purge system.

A purge control solenoid valve according to an exemplary form of the present disclosure includes: a middle housing in which an inlet flow path is formed and a middle flow path is formed on a center of the middle housing; a valve housing in which a driving module selectively communicating with the inlet flow path or the middle flow path is installed; an upper cover coupled to an upper part of the middle housing and including an upper flow path selectively communicated with the middle flow path; and a membrane provided on the upper cover and selectively communicating with the middle flow path or the upper flow path.

The membrane may include a membrane body of a disc shape selectively opening and closing the middle flow path; and a ventilation hole formed on an outer part of the membrane body along a circumferential direction of the membrane body.

The entire area of the ventilation hole may be formed to be larger than a cross-section of the upper flow path.

The purge control solenoid valve according to an exemplary form of the present disclosure may further include a plurality of guide protrusions formed to be protruded inside the upper cover in a radial direction of the upper cover.

The purge control solenoid valve according to an exemplary form of the present disclosure may further include a plurality of upper stoppers formed on a lower surface of the upper cover facing the center of the upper cover.

The upper stopper may be formed extending to the center of the upper housing from the guide protrusion.

The purge control solenoid valve according to an exemplary form of the present disclosure may further include a center stopper formed on the center of the lower surface of the upper cover.

The middle housing may include a middle body of a cylinder shape in which the inlet flow path is formed; a middle connection part extending inwardly in a radial direction of the middle body; and a middle protruded part extending from the middle connection part in an up/down direction and including the middle flow path.

The driving module may include a coil configured to be magnetized when power is supplied from a power source; a core configured to generate a magnetic force when the coil is magnetized; a steel armature selectively opening or closing the middle flow path by the magnetic force generated from the core; and a spring providing an elastic force in a direction that the steel armature closes the middle flow path.

The purge control solenoid valve according to an exemplary form of the present disclosure may further include a shock absorbing member installed at an upper part of the steel armature and absorbing an impact when being in contact with the middle flow path.

According to the purge control solenoid valve according to an exemplary form of the present disclosure, the additional check valve may be removed by adding the check valve function inside the purge control solenoid valve, thereby reducing a manufacturing of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
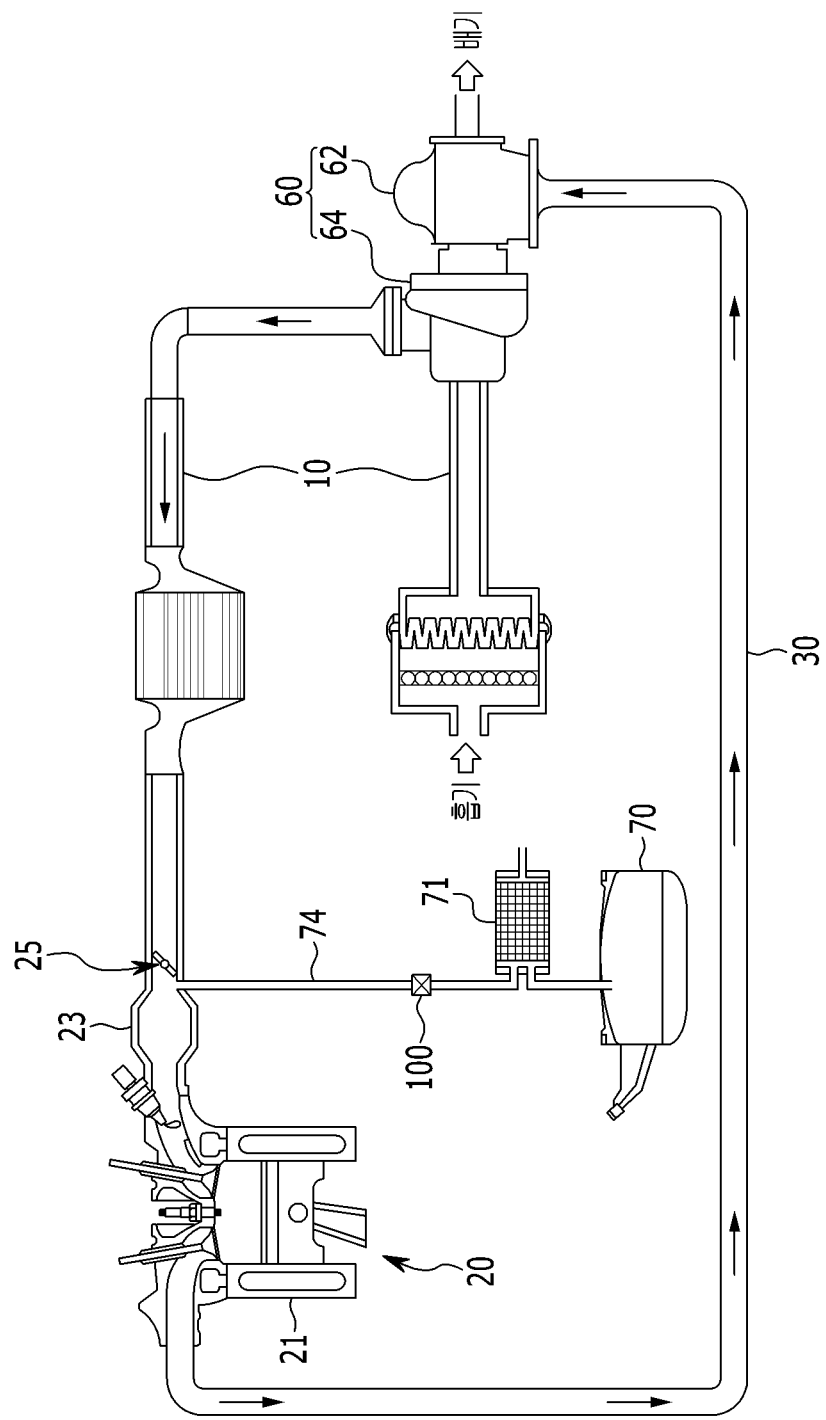
FIG. 1 is a view showing a canister purge system to which a purge control solenoid valve is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Components unrelated to the description will be omitted in order to obviously describe the present disclosure, and like reference numerals will be used to describe like components throughout the present disclosure.

Further, in the drawings, the sizes and the thicknesses of the components are exemplarily provided for the convenience of description, the present disclosure is not limited those shown in the drawings, and the thicknesses are exaggerated to clearly show several parts and regions.

Now, a fuel vapor purge system to which a purge control solenoid valve according to an exemplary form of the present disclosure is applied will be described with reference to accompanying drawings.

FIG. 1 is a view showing a canister purge system to which a purge control solenoid valve according to an exemplary form of the present disclosure is applied.

As shown in FIG. 1, a fuel vapor purge system includes: a canister 71 collecting a fuel vapor, and a purge control solenoid valve 100 for supplying the fuel vapor collected in the canister 71 to a cylinder 21 of an engine 20 and a front end of a turbocharger 60.

The engine 20 includes a plurality of cylinders 21 that generate a driving torque by combustion of fuel. The engine 20 has an intake line 10 in which an intake gas that is supplied to the cylinder 21 flows and an exhaust line 30 in which an exhaust gas that is discharged from the cylinder 21 flows.

Air that is injected through the intake line 10 is supplied to the cylinder 21 through an intake manifold 23. A throttle valve 25 that adjusts an air amount that is supplied to the cylinder 21 is mounted in the intake line 10 of the front end of the intake manifold 23.

The turbocharger 60 operates by an exhaust gas that is discharged from the cylinder 21 to compress and supply to an intake gas (external air+recirculation gas) to the cylinder 21. The turbocharger 60 includes a turbine 62 that is provided in the exhaust line 30 and that rotates by an exhaust gas that is discharged from the cylinder 21, and a compressor 64 that rotates by interlocking with the turbine 62 and that compresses an intake gas.

Volatile fuel that is supplied to the cylinder 21 is stored at a fuel tank 70, and the canister 71 is connected with the fuel tank 70 through a vapor line and contains an adsorbent material that can absorb a fuel vapor that has occurred at the fuel tank 70.

The purge control solenoid valve (PCSV) 100 is installed in a purge line 74 that is connected with the canister 71 and selectively blocks a fuel vapor that is collected in the canister 71. An operation of the purge control solenoid valve 100 is controlled by the ECU. In this case, a fuel vapor amount that is discharged through the PCSV 100 is adjusted by the duty control of the ECU.

Hereinafter, the configuration of the purge control solenoid valve according to an exemplary form of the present disclosure is described in detail with reference to accompanying drawings.

Figure 2:
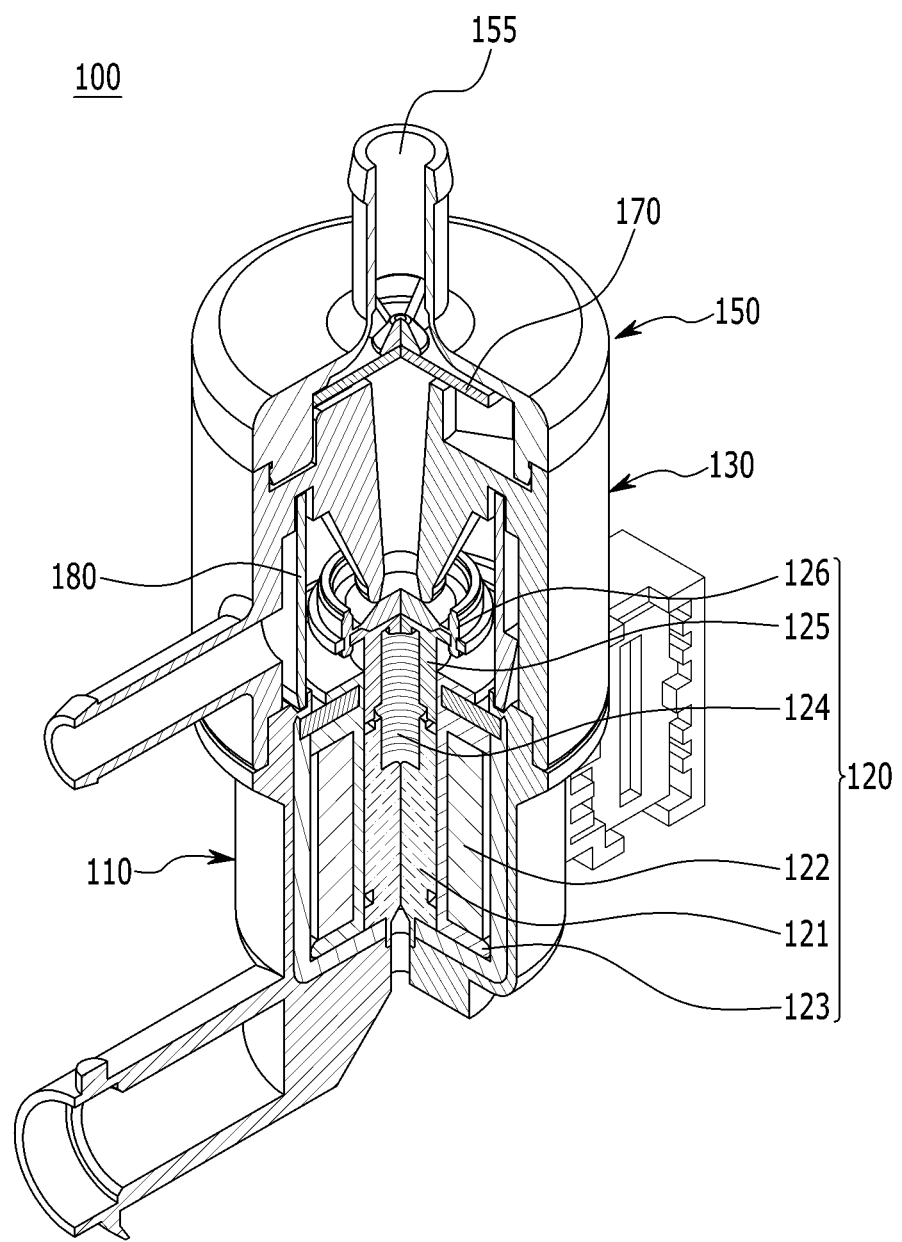
FIG. 2 is a view showing a configuration of a purge control solenoid valve.
Figure 3:
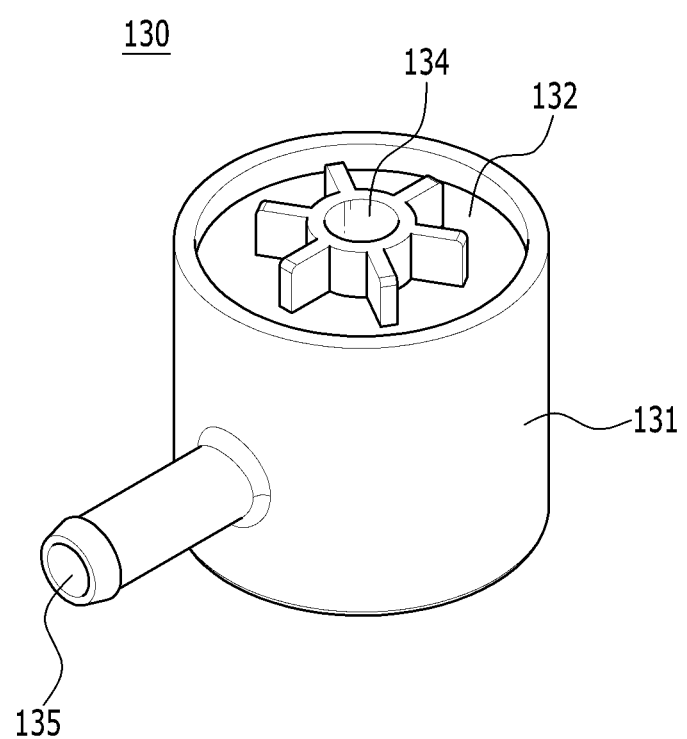
FIG. 3 is a perspective view showing a configuration of a middle housing.
Figure 4:
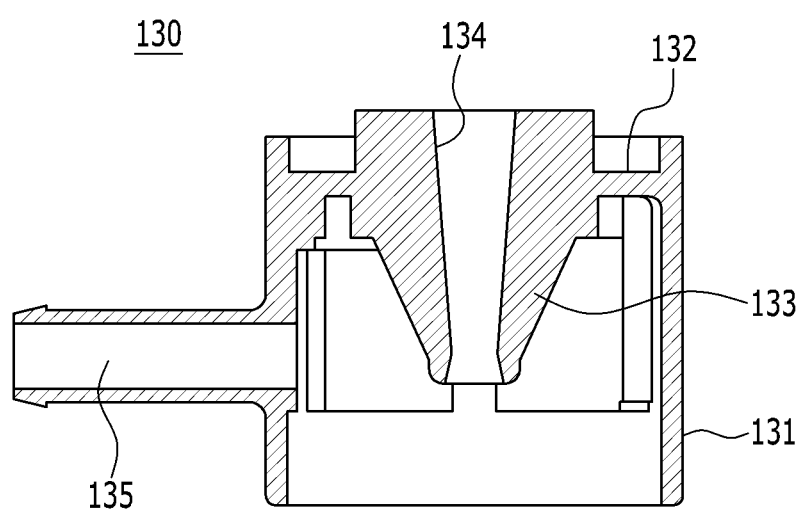
FIG. 4 is a cross-sectional view showing a configuration of a middle housing.
Figure 5:
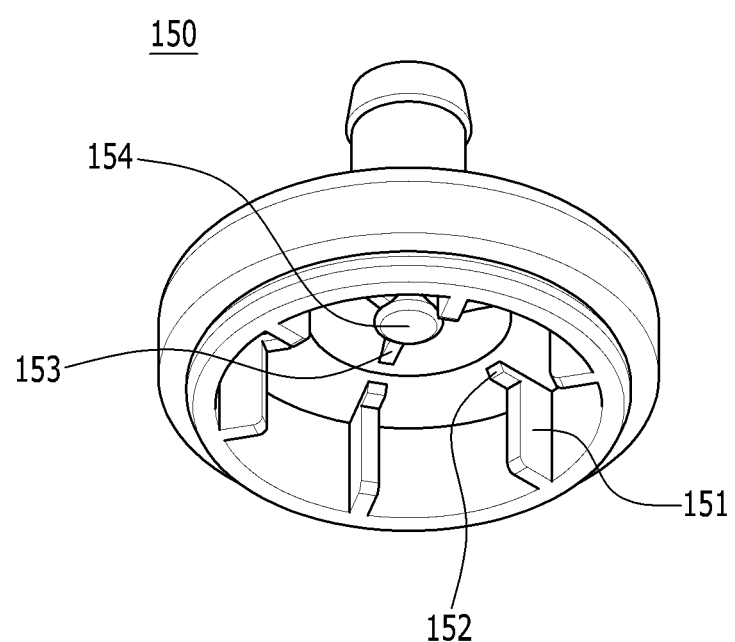
FIG. 5 is a perspective view showing a configuration of an upper cover.
Figure 6:
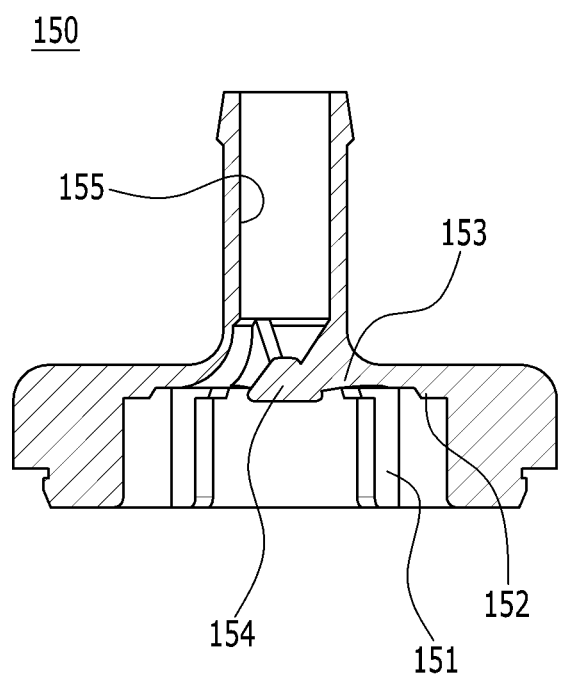
FIG. 6 is a cross-sectional view showing a configuration of an upper cover.
Figure 7:
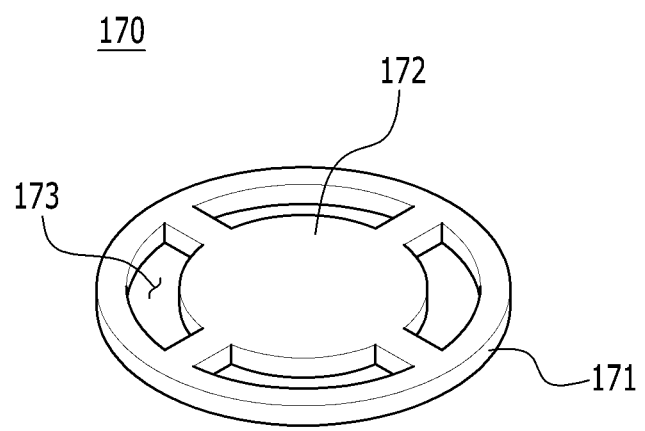
FIG. 7 is a perspective view showing a configuration of a membrane.
Figure 8:
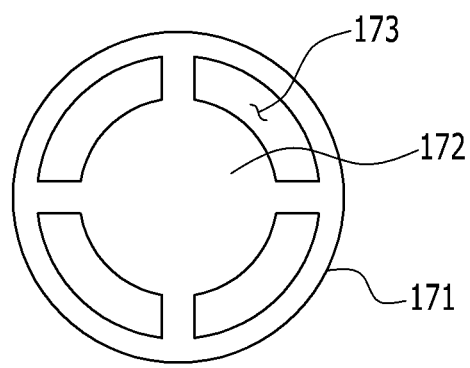
FIG. 8 is a top plan view showing a configuration of a membrane.

FIG. 2 is a view showing a configuration of a purge control solenoid valve according to an exemplary form of the present disclosure. FIG. 3 is a perspective view showing a configuration of a middle housing according to an exemplary form of the present disclosure. FIG. 4 is a cross-sectional view showing a configuration of a middle housing according to an exemplary form of the present disclosure. FIG. 5 is a perspective view showing a configuration of an upper cover according to an exemplary form of the present disclosure. FIG. 6 is a cross-sectional view showing a configuration of an upper cover according to an exemplary form of the present disclosure. FIG. 7 is a perspective view showing a configuration of a membrane according to an exemplary form of the present disclosure. Also, FIG. 8 is a top plan view showing a configuration of a membrane according to an exemplary form of the present disclosure.

As shown in FIG. 2 to FIG. 8, the purge control solenoid valve 100 includes a valve housing 110, a middle housing 130 coupled to the upper part of the valve housing 110, and an upper cover 150 coupled to the upper part of the middle housing 130.

The middle housing 130 includes a middle body 131 formed substantially in a cylindrical shape, a middle connection part 132 extending to an inside in a radial direction from the middle body 131, and a middle protruded part 133 extending in an up/down direction from the middle connection part 132 and formed in a cone shape.

An inlet flow path 135 to which the fuel vapor inflows is formed on the middle body 131, and a middle flow path 134 to which the fuel vapor is exhausted is formed on the center of the middle protruded part 133. The inlet flow path 135 is communicated with the canister 71 through the purge line 74

A filter 180 of a ring shape may be installed on the inside of the middle housing 130. The fuel vapor that inflows through the inlet flow path 135 is filtered by the filter 180.

A driving module 120 is installed inside the valve housing 110, as the driving module 120 selectively opens or closes the middle flow path 134 formed on the middle protruded part 133, the inlet flow path 135 and the middle flow path 134 are selectively communicated (fluidly communicated) to each other.

The driving module 120 includes a coil 122 generating a magnetic force according to the supply of the power source and spiral-wound to the bobbin 121, a core 123 generating the magnetic force at the time of the magnetization of the coil 122, a steel armature 124 selectively opening or closing the middle flow path 134 by the magnetic force generated in the core 123, and a spring 124 providing an elastic force in a direction that the steel armature 124 closes the middle flow path 134. On the steel armature 124, a shock absorbing member 126 absorbing the impact generated when the middle protruded part 133 on which the middle flow path 134 is formed and the steel armature 124 are in contact may be installed.

The upper cover 150 is formed of an approximate cylinder shape of which a lower surface is opened, and an upper flow path 155 is formed on the center. The upper flow path 155 is communicated with the intake manifold 23 through the purge line 74.

A membrane 170 formed of an elastic material is installed between the upper cover 150 and the middle housing 130. In detail, the membrane 170 is installed between the lower surface of the upper cover 150 and the upper surface of the middle protruded part 133 of the middle housing 130. When the upper cover 150 and the middle housing 130 are combined, the distance between the lower surface of the upper cover 150 and the upper surface of the middle protruded part 133 of the middle housing 130 is formed to be longer than the thickness of the membrane 170. Accordingly, the membrane 170 is movably installed between the lower surface of the upper cover 150 and the upper surface of the middle protruded part 133.

The membrane 170 includes a membrane body 171 formed of an approximate disc shape and at least one ventilation hole 173 formed on the outer of the membrane body 171 in the circumferential direction. The middle flow path 134 is blocked through the membrane body 171, and the fuel vapor is exhausted from the middle flow path 134 to the upper flow path 155 through the ventilation hole 173. That is, the middle flow path 134 of the middle housing 130 and the upper flow path 155 of the upper cover 150 are selectively communicated through the membrane 170.

In one form, the entire area of the ventilation hole 173 is formed to be larger than the cross-section of the upper flow path 155. As above-described, as the ventilation hole 173 is larger than the cross-section of the upper flow path 155, the flow amount of the fuel vapor flowing from the middle flow path 134 to the upper flow path 155 is sufficiently ensured.

A plurality of guide protrusions 151 are formed on the inside surface of the upper cover 150 and protruded inwardly from the inside surface in the radial direction of the inside surface of the upper cover 150. The guide protrusion 151 guides the membrane 170 moving in the up/down direction.

A plurality of upper stoppers 152 are formed on the lower surface of the upper cover 150. The upper stoppers 152 may extend from the guide protrusion 151 to the center of the upper cover. That is, the plurality of upper stoppers 152 is formed in the circumferential direction on the lower surface of the upper cover 150.

Also, a center stopper 154 is formed on the center of the lower surface of the upper cover 150. The center stopper 154 may be formed on the end part of the extending part 153 extending from the guide protrusion 151.

The upper stopper 152 and the center stopper 154 restrict a maximum moving amount of the membrane 170 and inhibit or prevent the membrane 170 from being excessively deformed when the membrane 170 moves in the up/down direction.

Hereinafter, the operation of the purge control solenoid valve according to an exemplary form of the present disclosure is described in detail.

The fuel vapor generated in the fuel tank 70 is collected by the canister 71.

In the driving region that the boosting is realized by the turbocharger 60, the supercharged pressure is supplied to the intake manifold 23. Accordingly, the supercharged air is supplied to the upper flow path 155 communicated with the intake manifold 23, thereby the membrane 170 moves downward, as the membrane center part 172 of the membrane body 171 is in contact with the upper surface of the middle protruded part 133, the middle flow path 134 and the upper flow path 155 are not communicated. Accordingly, the fuel vapor is prevented from flowing backward from the intake manifold 23 to the canister 71 by the membrane 170.

Also, since the power source is not supplied to the coil 122, as the steel armature 124 is in contact with the lower surface of the middle protruded part 133 on which the middle flow path 134 is formed by the elastic force of the spring 124, the inlet flow path 135 and the middle flow path 134 are not communicated with each other.

In contrast, in the driving region that the boosting is not realized by the turbocharger 60, since a negative pressure is formed in the intake manifold 23, the membrane center part 172 of the membrane body 171 of the membrane 170 is detached from the upper surface of the middle protruded part 133 by the negative pressure of the intake manifold 23. Accordingly, the upper flow path 155 and the middle flow path 134 are communicated.

Also, if the power source is applied to the coil 122 by the ECU, the magnetic force is generated in the core 123, steel armature 124 is pulled in the lower direction by the magnetic force generated in the core 123. Accordingly, the inlet flow path 135 and the middle flow path 134 are communicated.

As above-described, since the inlet flow path 135, the middle flow path 134, and the upper flow path 155 are communicated with each other, the fuel vapor inflowing from the canister 71 to the inlet flow path 135 through the purge line 74 is exhausted to the upper flow path 155 through the filter 180, the middle flow path 134, and the ventilation hole 173 of the membrane 170 and then is supplied to the intake manifold 23 through the purge line.

As above-described, as the membrane 170 performing the function of the check valve is integrally provided inside the purge control solenoid valve 100, since the additional check valve and additional parts for installing the check valve may be removed, a number of parts and assembly works are reduced such that a manufacturing cost of the vehicle is reduced.

Also, since a conventional check valve is operated by the negative pressure of the intake manifold, thereby a pulsation noise was generated. However, according to the exemplary forms of the present disclosure, the pulsation noise generated by the negative pressure of the intake manifold is reduced due to the internal space formed in the middle housing 130 and the upper cover.

Also, when the membrane 170 moves in the up/down directions, the membrane 170 is guided by the guide protrusion 151 and the moving amount is restricted by the plurality of upper stoppers 152 and the center stopper 154, thereby inhibiting or preventing the membrane 170 from being excessively deformed.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

10: intake line
20: engine
21: cylinder
23: intake manifold
25: throttle valve
30: exhaust line
60: turbocharger
62: turbine
64: compressor
70: fuel tank
71: canister
72: purge line
100: purge control solenoid valve
110: valve housing
120: driving module
121: bobbin
122: coil
123: core
124: spring
125: steel armature
126: shock absorbing member
130: middle housing
131: middle body
132: middle connection part
133: middle protruded part
134: middle flow path
135: inlet flow path
150: upper cover
151: guide protrusion
152: upper stopper
153: extending part
154: center stopper
155: upper flow path
170: membrane
171: membrane body
172: membrane center part
173: ventilation hole
180: filter

What is claimed is:

1. A purge control solenoid valve, comprising:
a middle housing in which an inlet flow path is formed and a middle flow path is formed on a center of the middle housing;
a valve housing in which a driving module selectively communicating with the inlet flow path or the middle flow path is installed;
an upper cover coupled to an upper part of the middle housing and including an upper flow path configured to selectively communicate with the middle flow path by a negative pressure formed in the upper flow path; and
a membrane provided on the upper cover and configured to selectively close an upper part of the middle flow path based on the negative pressure formed in the upper flow path,
wherein:
the membrane includes a membrane body including a ventilation hole formed on an outer part of the membrane body along a circumferential direction of the membrane body, and
a fuel vapor exhausted from the middle flow path selectively flows into the upper flow path through the ventilation hole when the driving module opens a lower part of the middle flow path.

2. The purge control solenoid valve of claim 1, wherein an entire area of the ventilation hole is formed to be larger than a cross-section of the upper flow path.

3. The purge control solenoid valve of claim 1, further comprising:
a plurality of guide protrusions formed to be protruded inside the upper cover in a radial direction of the upper cover.

4. The purge control solenoid valve of claim 3, further comprising:
a plurality of upper stoppers formed on a lower surface of the upper cover facing a center of the upper cover.

5. The purge control solenoid valve of claim 4, wherein the plurality of upper stoppers respectively extend toward the center of the upper cover from the plurality of guide protrusions.

6. The purge control solenoid valve of claim 1, further comprising:
a center stopper formed on a center of a lower surface of the upper cover.

7. The purge control solenoid valve of claim 1, wherein the middle housing includes:
a middle body in which the inlet flow path is formed;
a middle connection part extending inwardly in a radial direction of the middle body; and
a middle protruded part extending from the middle connection part in an up/down direction and including the middle flow path.

8. The purge control solenoid valve of claim 1, wherein the driving module includes:
a coil configured to be magnetized when power is supplied from a power source;
a core configured to generate a magnetic force when the coil is magnetized;
a steel armature configured to selectively open or close the lower part of the middle flow path by the magnetic force generated from the core; and
a spring providing an elastic force in a direction that the steel armature closes the lower part of the middle flow path.

9. The purge control solenoid valve of claim 8, further comprising:
a shock absorbing member installed at an upper part of the steel armature and absorbing an impact when being in contact with the middle flow path.

* * * * *